United States Patent
Normand et al.

(10) Patent No.: US 8,905,492 B2
(45) Date of Patent: Dec. 9, 2014

(54) QUICK-RELEASE SKEWER ADAPTED FOR USE WITH A CYCLE

(75) Inventors: Joseph Normand, Mery (FR); Jean-Pierre Mercat, Chavanod (FR)

(73) Assignee: Mavic S.A.S., Metz-Tessy (FR)

( * ) Notice: Subject to any disclaimer, the term of this patent is extended or adjusted under 35 U.S.C. 154(b) by 415 days.

(21) Appl. No.: 13/461,425

(22) Filed: May 1, 2012

(65) Prior Publication Data

US 2012/0280469 A1 Nov. 8, 2012

(30) Foreign Application Priority Data

May 2, 2011 (FR) ...................... 11 01358

(51) Int. Cl.
*B60B 35/00* (2006.01)
*B62K 25/02* (2006.01)

(52) U.S. Cl.
CPC ............. *B62K 25/02* (2013.01); *B62K 2206/00* (2013.01)
USPC ....................................... 301/124.2

(58) Field of Classification Search
CPC ... B62K 25/02; B62K 2206/00; B60B 27/026
USPC ........................ 301/124.2; 280/279
See application file for complete search history.

(56) References Cited

U.S. PATENT DOCUMENTS

| 5,022,672 | A | * | 6/1991 | Kawai ........................ 301/124.2 |
| 5,673,925 | A |   | 10/1997 | Stewart |
| 5,865,560 | A |   | 2/1999 | Mercat et al. |
| 7,530,645 | B2 | * | 5/2009 | Takachi ..................... 301/124.2 |
| 7,562,942 | B2 | * | 7/2009 | D'Aluisio .................. 301/124.2 |

FOREIGN PATENT DOCUMENTS

WO   WO-97/21586 A1   6/1997

* cited by examiner

*Primary Examiner* — Jason Bellinger
(74) *Attorney, Agent, or Firm* — Greenblum & Bernstein, P.L.C.

(57) ABSTRACT

Quick-release skewer including a longitudinal rod with first and second clamping abutments at first and second ends of the rod, a lever pivotally mounted on the first end of the rod, the lever having a cam, a movable support member between the periphery of the cam and a first outer abutment surface, the movable support member including a locking surface capable of coming into contact with the cam and separated from the first outer abutment surface by a distance D1, the movable support member including an unlocking surface capable of coming into contact with the cam and separated from the first outer abutment surface by a distance D2 that is less than D1. The difference between D1 and D2 is between 2.0 and 4.0 mm. When the support member is in a locking position, the cam contacts the locking surface; in the unlocking position, the cam contacts the unlocking surface.

9 Claims, 5 Drawing Sheets

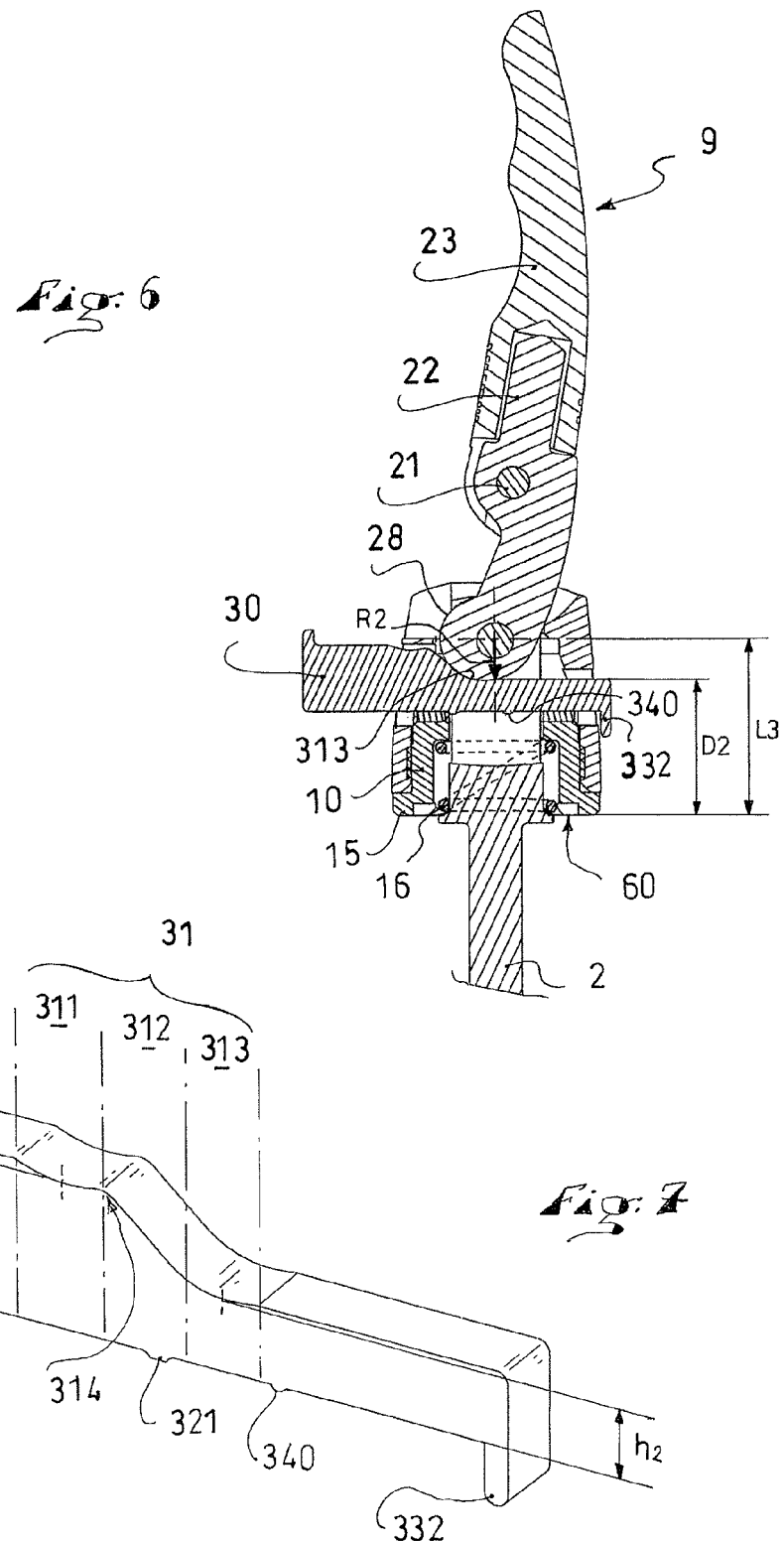

QUICK-RELEASE SKEWER ADAPTED FOR USE WITH A CYCLE

CROSS-REFERENCE TO RELATED APPLICATION

This application is based upon French Patent Application No. 11/01358, filed May 2, 2011, the disclosure of which is hereby incorporated by reference thereto in its entirety, and the priority of which is claimed under 35 U.S.C. §119.

BACKGROUND OF THE INVENTION

1. Field of the Invention

The invention relates to a quick-release skewer for locking one element to another, such as a wheel to a bicycle frame or other object or apparatus.

2. Background Information

Quick-release skewers of the aforementioned type are commonly used to mount and dismount a wheel on a bicycle frame or fork easily and quickly. They are also used in the cycle industry to immobilize the seat post on the seat tube, for example.

Known quick-release skewers for wheels include an elongated rod that extends through the wheel hub, with one end of the rod projecting on each side of the hub. One of the ends of the rod has a first clamping stop that is generally adjustable along the rod. This is usually a threaded end piece or a nut that is screwed onto the threaded end of the rod.

The other end of the rod has a second movable clamping stop, whose movement along the rod is controlled by a lever articulated at the end of the skewer and carrying an eccentric cam. The lever and its cam vary the distance separating the two stops. In particular, they make it possible to tighten simultaneously the two fork mounting brackets between the ends of the hub and the clamping stops.

In the area of the stop, the lever and its eccentric cam generate a movement with an axial component directed along the general direction of the rod.

For safety reasons, safety pins are arranged on the front fork ends (or on the frame tabs). These pins project from the surfaces of the frame or fork which receive the clamping stops. They are arranged such that, to bring the wheel into position, it is necessary to move the stops backward to allow passage above the pins. The height of these pins does not exceed a few millimeters and is slightly greater than the adjustment path generated by the cam. Thus, once the wheel is adequately attached to the bicycle, that is to say, after the lever is closed and an adequate tightening force has been applied, the wheel will not separate completely from the bicycle if the lever were to be opened and, therefore, the quick-release skewer were to become loose. Indeed, the wheel/bike connection will be loose but the wheel will remain in place as the safety pins retain the clamping stops, and therefore the wheel, in place. This loose wheel/bike connection can be sufficient for the cyclist to stop without falling, or at least makes it possible to avoid the most serious falls.

The presence of safety pins increase the number of manipulations required for mounting/dismounting a wheel on a bike. Notably, in addition to the handling of the lever, it is necessary to screw/unscrew at least one of the clamping stops, in general the nut.

Screwing/unscrewing the clamping stops give rise to a plurality of negative consequences in the use of conventional quick-release skewers.

First, it increases the time required for mounting and dismounting the wheel. Added to the increased mounting or dismounting time is a complicated manipulation requiring both hands to operate the quick-release skewer, with one hand on the lever and the other on the nut, thus making it impossible to hold the wheel or the frame.

Furthermore, and perhaps more importantly, it causes the tightening force actually used for mounting the wheel to be inaccurate, thereby making it difficult to reproduce such tightening. Indeed, after loosening the nut and dismounting the wheel, it is difficult to re-tighten the nut with precisely the same number of turns when re-mounting the wheel.

U.S. Pat. No. 5,673,925 discloses a quick-release skewer intended to address some of the problems of conventional devices. In this construction, one of the locking stops, the one that does not include the lever, is provided with an "expandable" ring. In reality, the nut into which the longitudinal rod of the quick-release skewer is screwed includes a T-shaped cap. A collar is inserted between this cap and the front fork end, which includes angular sectors of various lengths. The extensions of the T-shaped cap are in contact with the various angular sectors of the collar, depending upon the angular position of the collar. Thus, it is possible to change the spacing between the two clamping stops without unscrewing the nut.

A device of this type is still not optimal, insofar as it requires two-handed manipulation. Furthermore, the lever and ring of this device are handled completely independently from each other, which may cause errors during manipulation. Indeed, the user can fold the lever irrespective of the position of the ring; however, in order for the tightening to be applied correctly, the ring must be in the correct position prior to folding the lever.

SUMMARY

The present invention provides a quick-release skewer which overcomes the aforementioned drawbacks and, in particular, enables a bicycle wheel to be mounted/dismounted, or for otherwise locking/unlocking one element to another, without requiring either of the two clamping stops to be unscrewed.

In addition, the invention provides a quick-release skewer comprising at least one clamping stop equipped with an articulated lever comprising a cam that is easy to handle with one hand.

Further, the invention provides a quick-release skewer that is capable of remaining in the open position without continuous manual intervention from the user, in order to make it easier to mount/dismount a wheel on a bicycle frame, for example.

Still further, the invention provides a lever, the position of which unambiguously indicates the locking position of the rod.

Other features and capabilities of the invention will become apparent from the following description; such description being however given by way of non-limiting example.

To this end, the invention provides a quick-release skewer including a longitudinal rod, a first clamping stop comprising a first outer abutment surface, the first stop being positioned at the first end of the rod; a second clamping stop positioned at the second end of the rod; a lever pivotally mounted on the first end of the rod, the lever having a cam; a movable support member interposed between the cam periphery and the first outer abutment surface, the movable support member comprising a first support surface, referred to as the locking surface, which is capable of coming into contact with the cam and is separated from the first outer abutment surface by a distance D1; the movable support member further including a second support surface, referred to as the unlocking surface, which is capable of coming into contact with the cam and is separated from the first outer abutment surface by a distance D2 that is less than D1.

The invention also provides a quick-release skewer which, in addition to the features described in the preceding paragraph, includes any technically permissible combination of the characteristics listed below:
- the difference between distances D1 and D2 is between 2.0 and 4.0 mm, such as 3.0 mm or substantially equal to 3.0 mm;
- the movable support member is movable between a locking position, in which the cam is in contact with the locking surface, and an unlocking position, in which the cam is in contact with the unlocking surface;
- the movable support member is movable in translation;
- the lever is rotatable between a folded position and a deployed position, and an arrangement is provided to prevent the movable support member from switching from the locking position to the unlocking position when the lever is in the folded position;
- an arrangement is provided to prevent ill-timed displacement of the movable support member when the lever is in the deployed position.

BRIEF DESCRIPTION OF DRAWINGS

Other features and advantages of the invention will be better understood from the following description, with reference to the annexed drawings showing, by way of non-limiting embodiments, how the invention can be embodied, and in which:

FIG. 6 shows a view similar to FIGS. 3 and 5 in the open position; and

FIG. 7 shows a perspective view of the movable support member.

DETAILED DESCRIPTION

Figure 1:
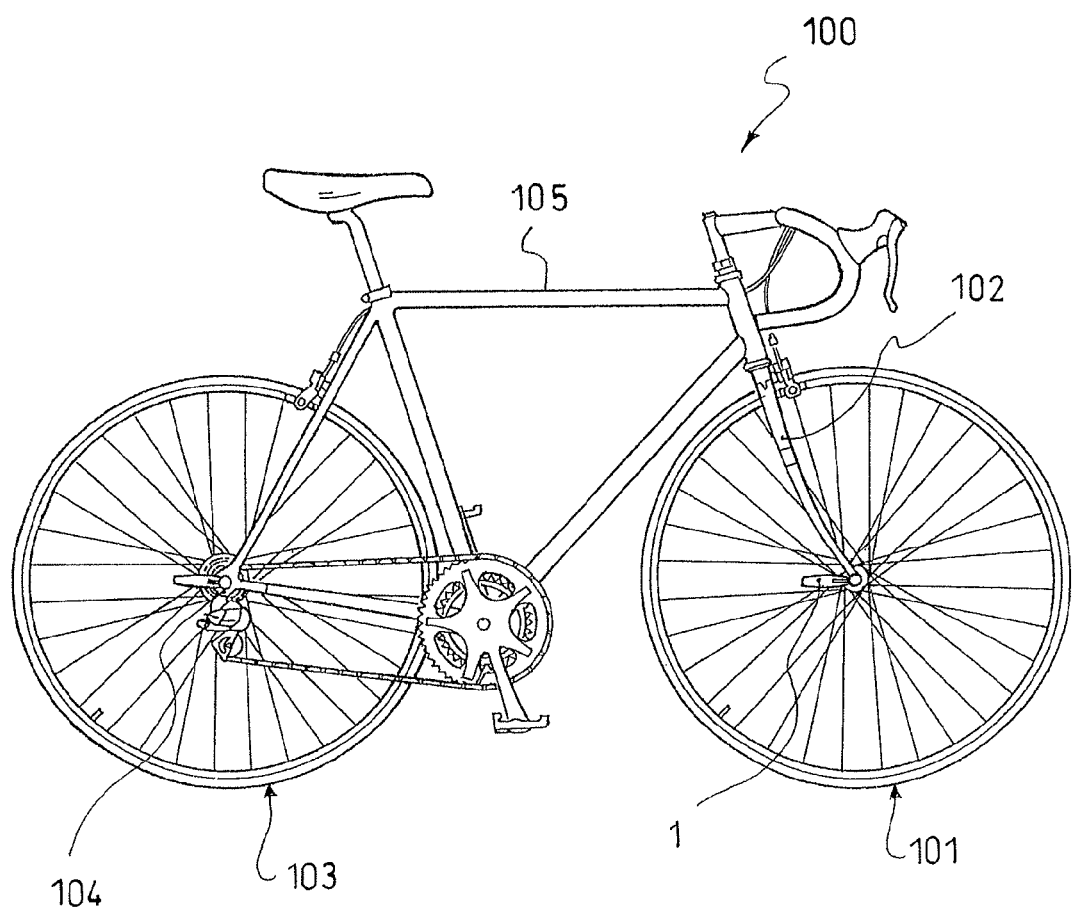
FIG. 1 shows a bicycle according to the invention.

The drawing figures illustrate a quick-release skewer provided for the assembly of a wheel on the frame of a cycle and, although the quick-release skewer according to the invention is particularly suitable for this use, it should be understood that the invention is suitable for other applications, such as locking a part on a cycle.

FIG. 1 shows a bicycle 100 according to the invention, equipped with a front wheel 101 retained in the two fork arms 102 by means of a first quick-release skewer 1 according to the invention. The rear wheel 103 is attached between the rear fork ends 104 of the frame 105 using a second quick-release skewer according to the invention. The two quick-release skewers can be identical and are described in detail below.

Figure 2:
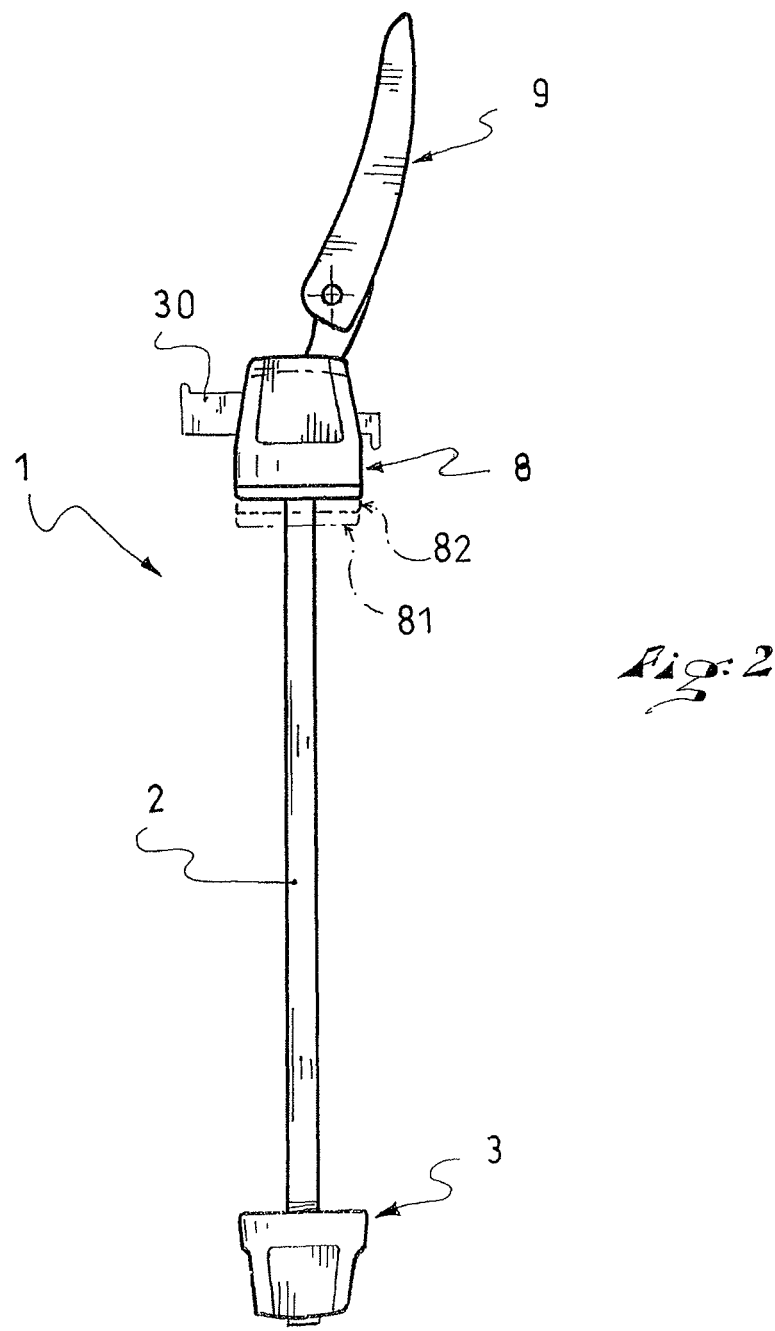
FIG. 2 shows a front view of a quick-release skewer according to a first non-limiting embodiment of the invention.

The quick-release skewer shown in FIG. 2 comprises a tapered rod 2 defining a longitudinal direction. As known, this rod is provided to engage in a through hole of the central shaft of the hub. For the purpose of additionally showing the general arrangement of a shaft extending through a hub for mounting a wheel to a bicycle fork, reference can be made, for example, to either of U.S. Pat. Nos. 5,022,672 and 7,562,942, the disclosures of which are hereby incorporated by reference thereto in their entireties.

The quick-release skewer includes a first clamping stop 8 in the area of the first end of the rod 2. Similar to known skewers, this first clamping stop is movable along the rod, and its movement can be controlled by a clamping lever 9. The first stop can be positioned in various states. These states include a closed position, also referred to as the clamping position, a half-open position, which can also be referred to as the unlocking position, and an open position, which is the position that enables the wheel to be dismounted from the bicycle frame. As can be understood from the following description, the transition from one state to another is done by manipulation of the clamping lever 9 and a movable support member 30.

The quick-release skewer is shown in the open position in FIG. 2. The broken line designated by the reference numeral 81 in FIG. 2 represents the location of the first clamping stop 8 when the quick-release skewer is in the closed position. The broken line designated by the reference numeral 82 represents the location of the stop 8 in the half-open position.

The rod 2 has a second clamping stop 3 at its other end. Although not limiting to the invention, the position of the stop 3 along the rod can be adjustable. As illustrated, for example, the rod 2 has a threaded zone at its end, and the second stop 3 includes a threaded end piece 4 which is screwed onto this threaded portion. In this case, although not essential to the invention, an O-ring 5 is used as a brake between the threads of the rod and the end piece 4. The O-ring is located in a shouldered housing of the end piece, and it is retained by a ring 6 which is assembled to the end piece by any appropriate means, such as, for example, screw threads or adhesive. Alternatively, any other suitable means can also be used.

The lever 9 partially actuates the displacement of the first stop 8 along the first end of the rod 2 by a structural assembly which is further described below.

At its first end, the rod 2 has a clevis 13 which, in a cross-sectional side view, is U-shaped and whose outer surface fits within a cylinder having an longitudinal axis coextensive with the axis of the rod. In the illustrated embodiment, the clevis 13 is unitary, i.e., one-piece, with the rod. This is not limiting; the clevis could be a part made separately and attached to the end of the rod.

The first stop 8 has a cylindrical clamping ring 10 having a central opening 12. The clamping ring 10 is slidably mounted along the clevis. It has a rim 15 on the outside of the clevis, which forms an outer support surface and which, in the remainder of this description, is referred to as the first outer abutment surface 60. This is the first outer abutment surface which is in contact with the bicycle frame or fork mounting brackets when the wheel is mounted on the bicycle. The second stop 3 comprises a second outer abutment surface 61, which is also in contact with the frame or fork of the bicycle. Adjusting the distance between the first outer abutment surface 60 and the second outer abutment surface 61 makes it possible to adapt the quick-release skewer to various wheels of various bicycles, respectively.

Although not limiting to the invention, the ring 10 can have a cup-shape whose opening is oriented towards the second stop 3, and whose rim 15 forms a clamping surface against the frame. The ring 10 is retained by a thread 17 provided in the body of the first stop. A spring 16 is positioned between a shoulder 18 of the clevis 13 and the bottom of the cup-shaped ring 10.

The central opening 12 of the ring is adjusted to the outer diameter of the clevis 13. The ring 10 is thus guided along a longitudinal direction.

Figure 4:
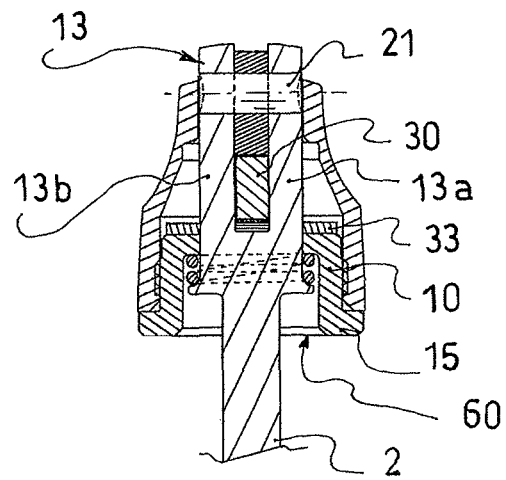
FIG. 4 shows a second partial transverse cross section of the quick-release skewer of FIG. 3 along a section plane perpendicular to the section plane of FIG. 3.

As shown in FIG. 4, the arms 13a and 13b of the clevis define therebetween a housing that is demarcated by two parallel or substantially parallel surfaces.

A rocker 20 of the lever 9 is engaged in this housing. The rocker 20 is rotatable about a transverse pin or axle 21 carried by the two arms 13a and 13b of the clevis. The rocker 20 has a uniform thickness, at least in its zone between the two arms of the clevis 13. This thickness is substantially equal to the distance between the two arms of the clevis.

The rocker 20 has an outer arm 22 which is extended by a control handle 23. In the illustrated embodiment, the handle 23 is an element separate from the rocker 20, which is fitted onto the arm of the rocker and is assembled using a pin, a screw, or any other suitable arrangement, such as a snap fastener or adhesive, for example. Moreover, a block of deformable material can be provided between the rocker 20 and the handle 23 to elastically eliminate backlash between the two elements.

This method of construction advantageously makes it possible to select different materials for the rocker and the handle; in particular, it is possible to make the rocker from a material adapted to withstand high compressive stresses and using a very simple method of manufacture. For example, the rocker, which has a uniform thickness, is made of stainless steel simply by cutting a sheet metal, which is optionally treated. The handle can be made of light alloy or plastic material, for example.

Also advantageously, the pin or axle of rotation 21 of the rocker is adapted to be shear-stressed by the rocker, and reactively by the arms of the clevis. As these elements are juxtaposed, the axle 21 works in good mechanical conditions and, for this reason, it is possible to give it a relatively small diameter. As a result, friction is reduced in this area.

Opposite the arm 22, that is to say, in the zone of the clevis 13, the rocker 20 has a peripheral eccentric zone adapted to act as a cam 28. The distance between the periphery of the cam 28 and the axle 21 increases correspondingly from a first sector located in the extension of the arm up to another sector located approximately perpendicular. Any of different appropriate structural shapes can be suitable in making the cam 28, such as, for example, a variable curvature or a plurality of successive constant curvatures, or even a single eccentric curvature. Good results can be obtained with such a distance ranging between about 4.0 and 5.0 millimeters, that is to say, a travel over a distance of 1.0 millimeter over a cam angle of approximately 120 degrees. However, these particular dimensions are not limiting to the invention.

A movable support member 30 is located between the arms of the clevis 13, between the cam 28 of the rocker and the ring 10. This movable support element 30 is in the form of a beam. This beam, shown in perspective in FIG. 7, has a uniform thickness over a major portion of its length so as to be able to slide between the arms of the clevis. In front view, the member 30 generally has a shape combining two rectangles of different heights, separated by a trapezoid. The height h1 of the left portion of the movable support member 30, in the orientation shown in FIG. 7, is greater than the height h2 of the right portion.

Although not limiting to the invention, the central zone of the upper portion 31 of the member 30 shown in the drawings has a very carefully designed shape, and it is structured and arranged to provide counter-support to the cam 28. The central zone 31, which is defined by the broken lines in FIG. 7, is divided into three distinct portions, namely, a locking surface 311, an unlocking surface 313, and a ramp 312. The locking 311 and unlocking 312 surfaces are concave. The radius of curvature of these surfaces is substantially close to the larger radius of curvature of the cam 28, or slightly greater to allow for a slight bending of the beam and to maintain a quasi-linear support surface when the cam 28 is in contact with these portions. The ramp 312 is the linkage between the locking 311 and unlocking 313 surfaces. In the area of its junction with the locking surface 311, it constitutes a mount 314 centered on an inflection zone of the profile of the upper portion 31 of the member 30.

For the radii of curvature of the surfaces 311 and 313, choosing radii close to that of the cam 28 advantageously makes it possible to reduce the contact pressure between the rocker and the movable support member 30. As known, this pressure is indeed dependent upon the difference in the curvature of the elements in contact.

The lower portion 32 of the movable support member 30 is provided to exert support against the clamping ring 10 in the longitudinal direction of the rod. In the embodiment shown, this support is effected via a washer 33 whose inner diameter is substantially equal to the outer diameter of the clevis 13, and whose outer diameter is close to the outer diameter of the ring 10. The washer is a pressure element, made of any appropriate material, such as stainless steel, for example. Because of the washer 33, the ring 10 can be made of light alloy, such as aluminum alloy, for example.

The lower portion 32 of the beam has a lug 321 projecting from the remainder of the lower portion. The lug 321 ensures the proper positioning and retention of the beam above the washer. Indeed, when the support member 30 is being used and slides, as described below, the lug 321 cannot escape from the central opening of the washer 33.

The movable support member 30 can be made by cutting a stainless steel sheet, or any other material resistant to hammering and bending.

Figure 3:
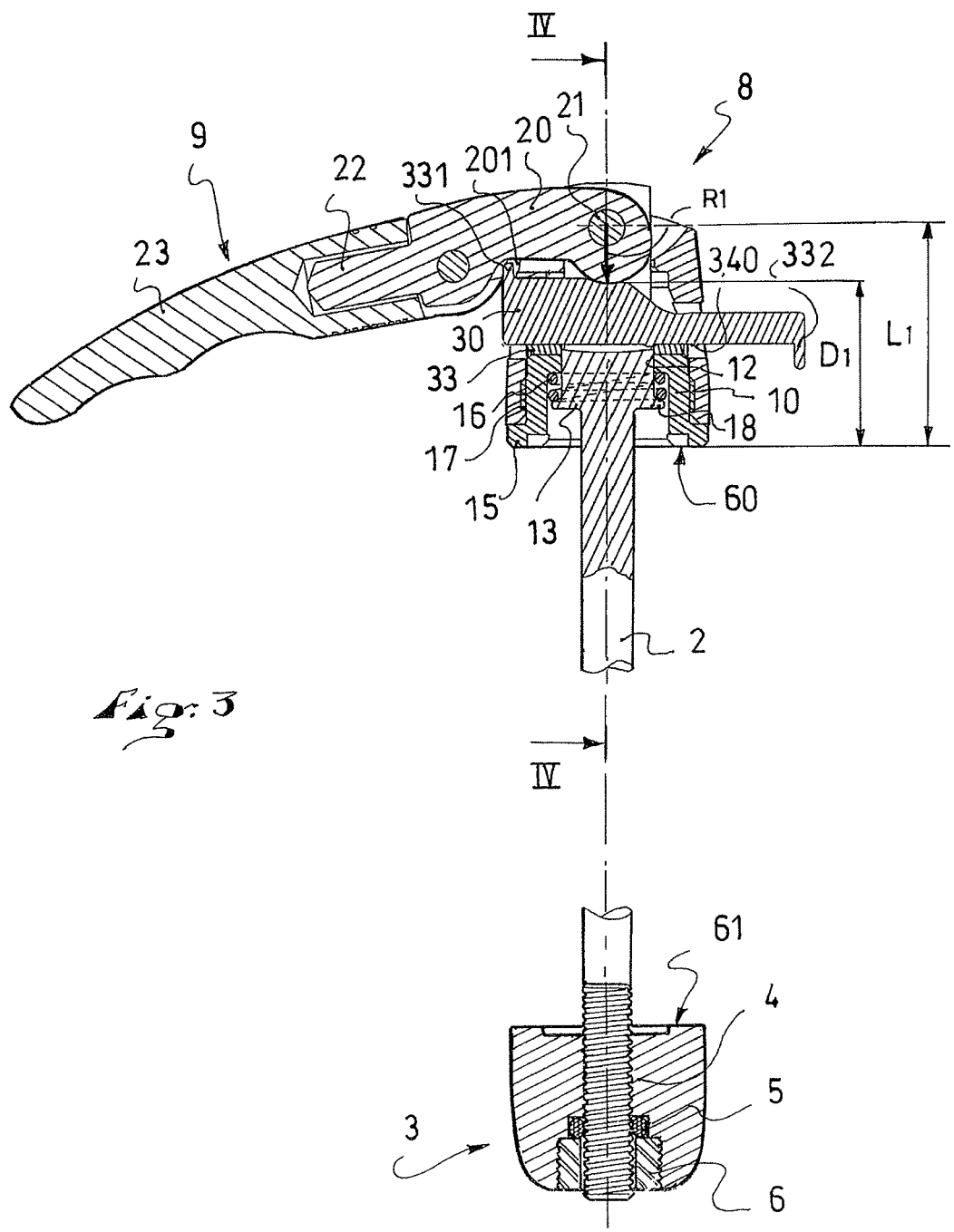
FIG. 3 shows a partial transverse cross section of the quick-release skewer of FIG. 2 in the closed position.
Figure 5:
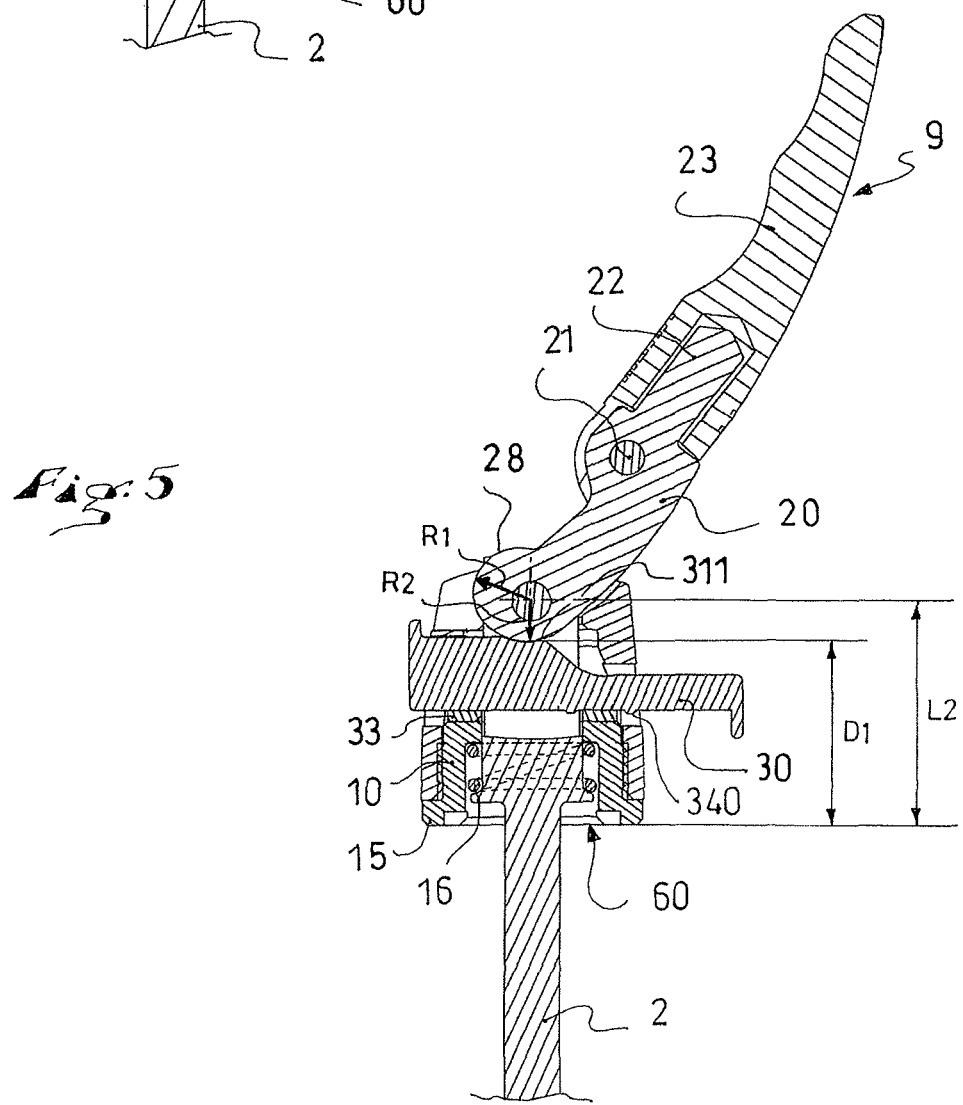
FIG. 5 shows a view similar to FIG. 3 in a half-open position.

FIGS. 3, 5, and 6 facilitate an understanding of the series of movements in the switch of the quick-release member from the closed position to the open position, and vice versa. In FIG. 3, the quick-release skewer is in the closed position, which corresponds to the position taken when the wheel is firmly retained in the frame or the fork of the bike. In this position, the movable support member 30 is in the locking position, and the rocker 20 is folded so that the portion of the cam 28 having the greatest cam height is supported against the locking portion 311 of the member 30.

The quick-release skewer according to the exemplary embodiment illustrated in the drawings is equipped with a safety arrangement that prevents accidental opening thereof. This arrangement includes a housing 201 positioned beneath the rocker 20 and a projection 331 extending from the end of the locking portion of the member 30. When the lever 9 and, therefore, the rocker 20, are folded, the projection 331 is received in the housing 201, and the member 30 cannot slide as long as the lever remains in the folded position. Friction and the recess of the support member also ensure this retention.

In the closed position, the distance L1 separating the axle 21 (rocker/rod pivot connection) from the first outer abutment surface 60 is very close to its maximum value, i.e., the value corresponding to the smallest spacing between the two outer abutment surfaces. This distance L1 corresponds to the distance D1 separating the locking portion 311 and the first locking surface 60, plus the maximum cam height R1 of the cam 28 (L1=D1+R1). The maximum value of the distance separating the axle 21 from the surface 60 is maximum during passage of the top dead center of the cam 28, right before (a few degrees) the closed position.

To disassemble the bicycle wheel, the user manipulates the lever 9 until it is in its deployed position, as shown in FIG. 5. FIG. 5 corresponds to the half-open position of the quick-release skewer. In this position, the distance L2 (axle 21 to surface 60) is reduced in relation to the equivalent distance L1. The reduction (L1−L2) corresponds exactly to the difference between the maximum R1 and minimum R2 cam heights.

The difference R1−R2 is selected so that the manipulation of the lever remains relatively easy for the user. In the illustrated exemplary embodiment, a difference is selected between 1.0 and 3.0 mm, such as 2.0 mm or approximately 2.0 mm. In the half-open position, the distance separating the two outer support surfaces 60, 61 of the quick-release skewer is slightly greater than the axial space requirement of the wheel hub, plus the thicknesses of the arms of the frame and fork, respectively, of the bicycle. Thus, the mounting of the wheel is loose. However, if the bicycle is provided with safety pins, the wheel is not completely separated from the bicycle when the quick-release skewer is in the half-open position. Indeed, the distance between the two outer support surfaces 60, 61 remains less than the axial space requirement of the wheel hub, plus the thicknesses of the arms of the frame (fork) and the height of the safety pins.

Under these conditions, an ill-timed shift of the lever 9 into its deployed position does not automatically cause the rider to fall, insofar as the retention of the wheel on the bicycle, albeit loose, enables the rider to stop without injury.

To switch from the half-open position (FIG. 5) to the open position (FIG. 6), the user exerts pressure on the unlocking end 332 and slides the movable support member 30 to the unlocking position, whereas the lever is not operated and remains in its deployed position. The deployed position of the lever 9 provides a point of support for the handling of the movable support member. Indeed, the user can easily exert pressure with the thumb on the end 332 while holding the lever with the other four fingers of the same hand. Handling the quick-release skewer of the invention with one hand is obviously a significant advantage of the invention over the prior art.

Although not essential to the invention, a structural arrangement is provided to prevent ill-timed displacement of the movable support member 30, in particular when the lever 9 is in the deployed position. Such an arrangement is comprised of a boss 340 positioned on the lower surface 32 of the movable support member 30. When the lever 9 is in the deployed position, the boss 340 is located outside the space demarcated by the washer 33. The spring 16 forces the movable support member 30 against the washer 33 and friction normally prevents free sliding of the support member. The boss 340 also functions to prevent undesired sliding of the member 30 from its locking position.

In the open position, the distance L3 separating the axle 21 from the first outer support surface 60 is minimal. Thus, the distance separating the two outer abutment surfaces 60, 61 is greater than the axial space requirement of the wheel hub, plus the thicknesses of the arms of the frame or fork and the heights of the safety pins. Therefore, the wheel can be removed from the bicycle without unscrewing the second stop 3. The distance L3 is equal to the distance D2 separating the unlocking portion 313 of the outer support surface 60, plus the minimum cam height R2 of the cam 28 (L3=D2+R2). The distance L3 is reduced in relation to the distance L2 by a value "L2−L1" which is equal to the difference D2−D1, the latter being exactly equal to the difference between the height h1 of the locking portion of the member 30 and the height h2 of the unlocking portion. The difference between distances D1 and D2 is between 2.0 and 4.0 mm, such as 3.0 mm or substantially equal to 3.0 mm.

The open position of the first stop 8 is a stable position, and the user can release the pressure on the movable support member and the grip of the lever 9 without the stop leaving the open position on its own. This characteristic contributes to the ease and convenience of use of the quick-release skewer according to the invention.

To be able to re-assemble the wheel to the bicycle, the user ensures that the lever is in the deployed position. The user also ensures that the movable support member is in the unlocking position. If the latter is not in this position and the fork and frame of the bicycle are equipped with safety pins, then it is not possible to insert the wheel into position. To remedy this, the user need only slide the movable support member into the unlocking position. If the bicycle is not equipped with safety pins, the user can insert the wheel, but cannot properly close the lever. Indeed, the safety arrangement, mentioned above, is such that, as long as the projection 331 cannot be received in the housing 201, the lever cannot assume its closed position.

Therefore, once the quick-release skewer is in the open position, the user positions the wheel in its location, slides the movable support member in the locking position, and then rocks the lever into the folded position.

Other alternative constructions are also possible without departing from the scope of the invention.

Finally, as explained at the beginning of this description, the scope of the invention is such that it can be utilized in applications other than that of a wheel quick-release skewer, including a quick-release skewer for locking the seat post into the seat tube or, in general, a quick-release skewer for the collar.

The invention disclosed herein by way of exemplary embodiments suitably may be practiced in the absence of any element or structure which is not specifically disclosed herein.

The invention claimed is:

1. A quick-release skewer comprising:
   a longitudinal rod having a first end and a second end;
   a first clamping stop comprising a first outer abutment surface;
   the first stop being positioned at the first end of the rod;
   a second clamping abutment positioned at the second end of the rod;
   a lever pivotally mounted on the first end of the rod;
   the lever having a cam, the cam having a peripheral cam surface;
   a movable support member interposed between the peripheral cam surface and the first outer abutment surface;
   the movable support member comprising:
     a first support surface comprising a locking surface;
     a second support surface comprising an unlocking surface;
   the locking surface being structured and arranged to come into contact with the cam surface;
   the locking surface being separated from the first outer abutment surface by a first distance;
   the unlocking surface being structured and arranged to come into contact with the cam surface;
   the unlocking surface being separated from the first outer abutment surface by a second distance, the second distance being less than the first distance.

2. A quick-release skewer according to claim 1, wherein:
   the difference between the first and second distances is between 2.0 and 4.0 mm.

3. A quick-release skewer according to claim 1, wherein:
the difference between the first and second distances is equal to or substantially equal to 3.0 mm.

4. A quick-release skewer according to claim 1, wherein:
the movable support member is structured and arranged to move between a locking position and an unlocking position;
in the locking position the cam is in contact with the locking surface;
in the unlocking position the cam is in contact with the unlocking surface.

5. A quick-release skewer according to claim 1, wherein:
the movable support member is structured and arranged for movement in translation.

6. A quick-release skewer according to claim 1, wherein:
the lever is rotatable between a folded position and a deployed position;
the skewer further comprises a safety arrangement structured and arranged to prevent the movable support member from switching from the locking position to the unlocking position when the lever is in the folded position.

7. A quick-release skewer according to claim 1, further comprising:
an arrangement structured and arranged to prevent ill-timed displacement of the movable support member when the lever is in the deployed position.

8. A wheel comprising:
a hub;
a quick-release skewer structured and arranged to extend through the hub, the quick-release skewer comprising:
a longitudinal rod having a first end and a second end;
a first clamping stop comprising a first outer abutment surface;
the first stop being positioned at the first end of the rod;
a second clamping abutment positioned at the second end of the rod;
a lever pivotally mounted on the first end of the rod;
the lever having a cam, the cam having a peripheral cam surface;
a movable support member interposed between the peripheral cam surface and the first outer abutment surface;
the movable support member comprising:
a first support surface comprising a locking surface;
a second support surface comprising an unlocking surface;
the locking surface being structured and arranged to come into contact with the cam surface;
the locking surface being separated from the first outer abutment surface by a first distance;
the unlocking surface being structured and arranged to come into contact with the cam surface;
the unlocking surface being separated from the first outer abutment surface by a second distance, the second distance being less than the first distance.

9. A bicycle comprising:
a frame having a fork;
a wheel having a hub;
a quick-release skewer structured and arranged to extend through the hub and to be mounted to the fork, the quick-release skewer comprising:
a longitudinal rod having a first end and a second end;
a first clamping stop comprising a first outer abutment surface;
the first stop being positioned at the first end of the rod;
a second clamping abutment positioned at the second end of the rod;
a lever pivotally mounted on the first end of the rod;
the lever having a cam, the cam having a peripheral cam surface;
a movable support member interposed between the peripheral cam surface and the first outer abutment surface;
the movable support member comprising:
a first support surface comprising a locking surface;
a second support surface comprising an unlocking surface;
the locking surface being structured and arranged to come into contact with the cam surface;
the locking surface being separated from the first outer abutment surface by a first distance;
the unlocking surface being structured and arranged to come into contact with the cam surface;
the unlocking surface being separated from the first outer abutment surface by a second distance, the second distance being less than the first distance.

\* \* \* \* \*